US009864976B2

(12) United States Patent
Wanielista et al.

(10) Patent No.: US 9,864,976 B2
(45) Date of Patent: Jan. 9, 2018

(54) TRANSFERRING FUNDS BETWEEN FINANCIAL ACCOUNTS OF TWO ACCOUNTHOLDERS

(71) Applicant: Simple Finance Technology Corp., Portland, OR (US)

(72) Inventors: Thomas Wanielista, New York, NY (US); Tad Fisher, Portland, OR (US); Matthew Moyer, Portland, OR (US); Colin Ruffenach, Portland, OR (US); Tristan Waddington, Portland, OR (US); Jarred Ward, Portland, OR (US)

(73) Assignee: Simple Finance Technology Corp., Portland, OR (US)

( * ) Notice: Subject to any disclaimer, the term of this patent is extended or adjusted under 35 U.S.C. 154(b) by 486 days.

(21) Appl. No.: 14/481,780

(22) Filed: Sep. 9, 2014

(65) Prior Publication Data
US 2015/0073991 A1   Mar. 12, 2015

Related U.S. Application Data

(60) Provisional application No. 61/875,942, filed on Sep. 10, 2013.

(51) Int. Cl.
*G06Q 20/10* (2012.01)
*G06Q 20/40* (2012.01)
*G06Q 20/32* (2012.01)

(52) U.S. Cl.
CPC ............ *G06Q 20/10* (2013.01); *G06Q 20/32* (2013.01); *G06Q 20/4014* (2013.01)

(58) Field of Classification Search
CPC ............................ G06Q 20/32; G06Q 20/327

USPC ........................................................ 705/44
See application file for complete search history.

(56) References Cited

U.S. PATENT DOCUMENTS

| 8,458,088 B2* | 6/2013 | Dunwoody | G06Q 20/223 705/35 |
| 2009/0192912 A1* | 7/2009 | Griffin | G06Q 20/10 705/26.1 |
| 2010/0169212 A1 | 7/2010 | Paintin | |
| 2010/0211498 A1* | 8/2010 | Aabye | G06Q 20/10 705/39 |
| 2012/0041877 A1* | 2/2012 | Rao | G06Q 20/108 705/43 |
| 2013/0151419 A1 | 6/2013 | Hitchcock et al. | |

(Continued)

FOREIGN PATENT DOCUMENTS

| KR | 1020110012591 A | 2/2011 |
| KR | 1020110131814 A | 12/2011 |
| KR | 1020130054775 A | 5/2013 |

OTHER PUBLICATIONS

International Search Report and Written Opinion for counterpart PCT Application No. PCT/US2014/054844, dated Dec. 17, 2014 (16 pages).

*Primary Examiner* — Jagdish Patel
(74) *Attorney, Agent, or Firm* — Perkins Coie LLP

(57) ABSTRACT

A facility for initiating a funds transfer operation is described. The facility displays on a mobile device identity verification information for other people each associated with another mobile device within a maximum distance. For example, the displayed identity verification information may be a picture of the person. The user may select one of these in order to initiate a funds transfer operation to the selected person.

36 Claims, 8 Drawing Sheets

(56) References Cited

U.S. PATENT DOCUMENTS

2014/0330656 A1* 11/2014 Zhou ............... G06Q 20/322
  705/16
2015/0066748 A1* 3/2015 Winslow ............. G06Q 20/10
  705/39

* cited by examiner

TRANSFERRING FUNDS BETWEEN FINANCIAL ACCOUNTS OF TWO ACCOUNTHOLDERS

RELATED APPLICATIONS

This application claims the benefit of U.S. Provisional Patent Application No. 61/875,942, filed on Sep. 10, 2013, which is hereby incorporated by reference in its entirety.

TECHNICAL FIELD

The described technology is directed to the field of electronic banking.

BACKGROUND

The easiest way to transfer funds between two individuals' financial accounts has traditionally been for a transferor accountholder to write a check to a transferee accountholder. The transferee accountholder then deposits the check in his or her account to effect the transfer.

DETAILED DESCRIPTION

The inventors have recognized that checks have the disadvantages that they can be slow to process and are insecure. In addition, the timeframe between a customer receiving a check and actually executing the transfer can span on the order of days. This can become a problem when the funds necessary to complete a check transfer are insufficient. Further, newer systems that transfer funds between accounts without using checks tend to be are slow, awkward to use, and insecure.

In view of these disadvantages of conventional approaches to funds transfer, the inventors have determined that a fund transfer mechanism that provides an easier, quicker, and safer process for customers of a financial institution would help prevent cases of fraud, and vastly improve the overall experience and convenience of transferring funds directly between financial accounts, and thus would have significant utility.

Accordingly, the inventors herein describe a software and/or hardware facility for initiating a funds transfer operation between the accounts of two accountholders that conditions performance of the transfer on the physical proximity of two devices each associated with one of the accountholders ("the facility") that enables users of the facility to exchange money in a way that is fast, easy and relatively secure.

Figure 1:
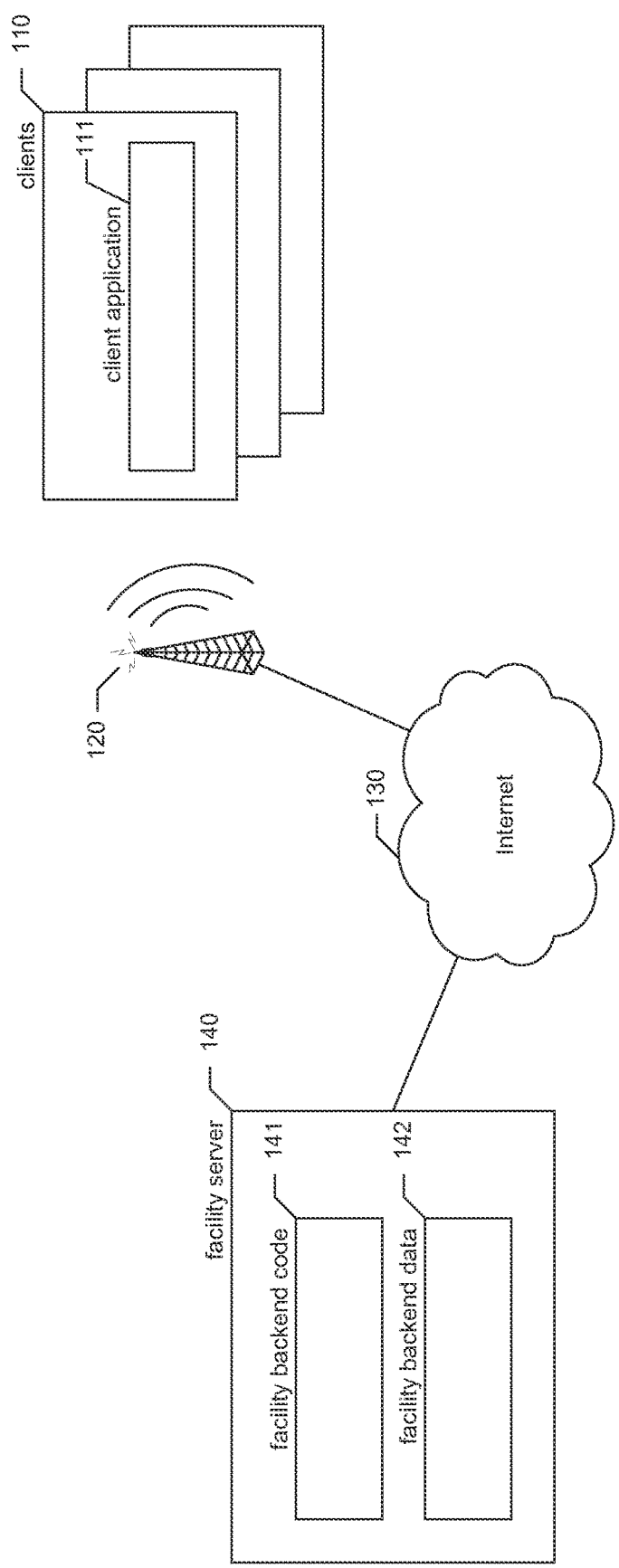
FIG. 1 is a network diagram showing an arrangement of components used to provide the facility in some embodiments.

FIG. 1 is a network diagram showing an arrangement of components used to provide the facility in some embodiments. Accountholders interact with a customer application 111 executing on a number of client devices 110—such as smartphones or similar mobile devices—to initiate transfers. The customer application communicates wirelessly, such as via a wireless base station 130, and then via the Internet 140 or other network, with a facility server 140. The facility server stores account information, receives and responds to discovery requests and transfer instructions from client devices. The facility server includes both facility backend code 141 and facility backend data 142. All information exchanged between the server and each client is via a verified secure connection. In some embodiments, the facility establishes a secure connection between each client and the server using the TLS 1.2 protocol, together with the TLS_ECDHE_RSA_WITH_AES_256_GCM_SHA384 cipher suite. In some embodiments, in connection with this connection type, the facility uses the TLS 1.2 certification verification process.

Figure 2:
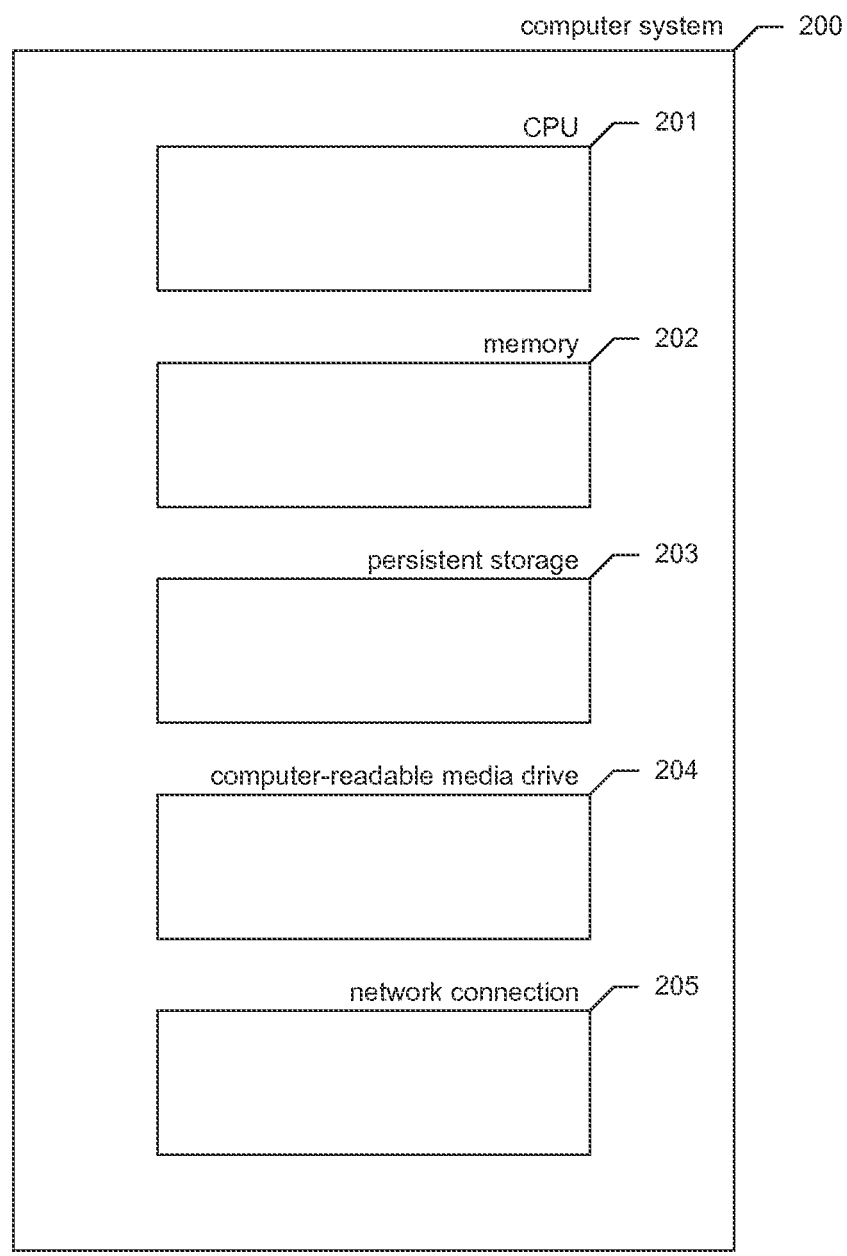
FIG. 2 is a block diagram showing some of the components typically incorporated in at least some of the clients, servers, and other devices on which the facility operates.

FIG. 2 is a block diagram showing some of the components typically incorporated in at least some of the clients, servers, and other devices on which the facility operates. In various embodiments, these devices 200 can include server computer systems, desktop computer systems, laptop computer systems, netbooks, mobile phones, personal digital assistants, televisions, cameras, automobile computers, electronic media players, computer cards, etc. In various embodiments, the computer systems and devices include zero or more of each of the following: a central processing unit ("CPU") 201 for executing computer programs; a computer memory 202 for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Client devices typically also include a wireless transceiver for performing wireless communication in accordance with a number of standards and protocols, including numerous common cellular data communication standards, wifi communication standards, Bluetooth communication standards including Bluetooth Low Energy, and near-field communication.

While various embodiments are described in terms of the environment described above, those skilled in the art will appreciate that the facility may be implemented in a variety of other environments including a single, monolithic computer system, as well as various other combinations of computer systems or similar devices connected in various ways.

Figure 3:
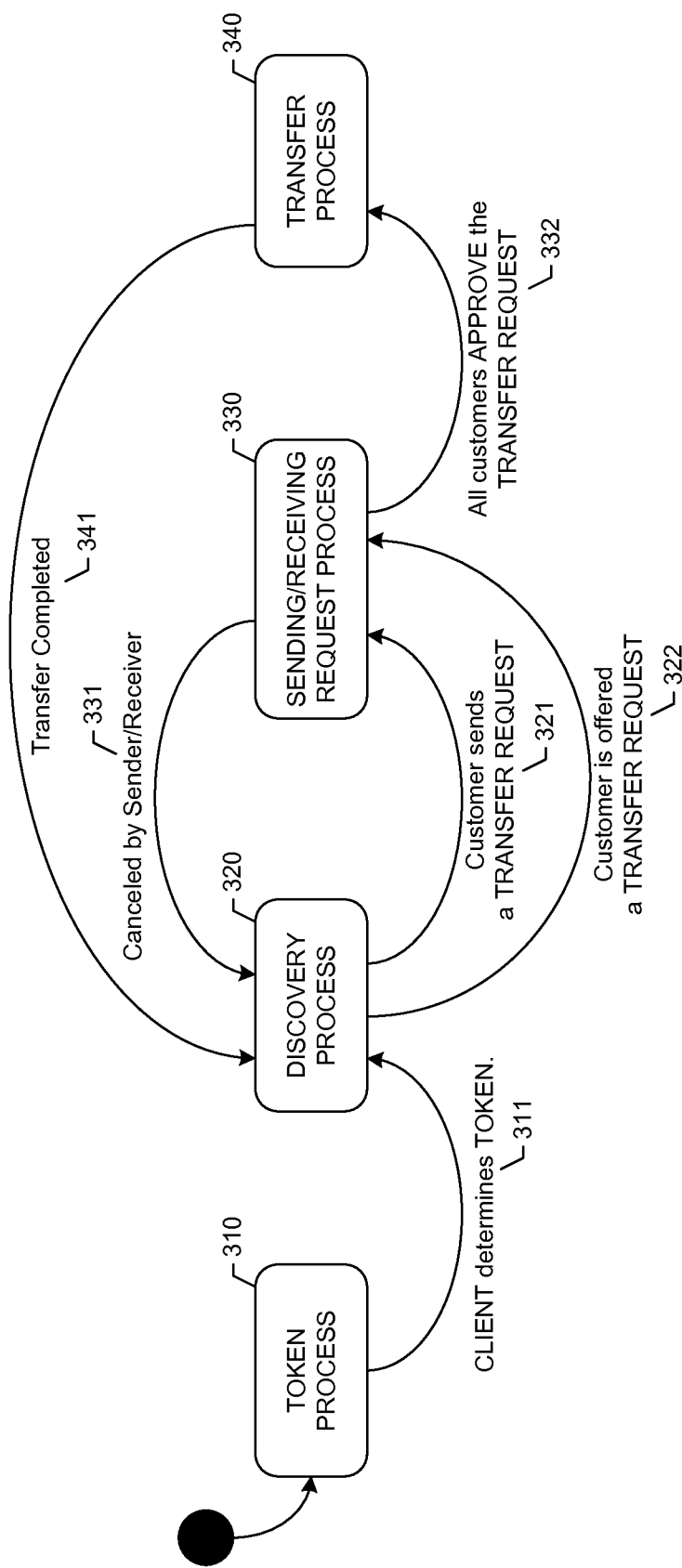
FIG. 3 is a state diagram that provides an overview of the process of instituting a transfer.

FIG. 3 is a state diagram that provides an overview of the process of instituting a transfer. In a token process state 310, the server provides each client with a token, which is a value that can be used to uniquely identify an accountholder, and, indirectly, one or more accounts of the associated accountholder. The token provided by the server is stored by the client, leading the client to a discovery process state 320. In this state, each client discovers other clients who are in close physical proximity, and displays information intended to help the accountholder using a particular client to verify the identity of accountholders using the discovered clients. An accountholder can then select one of the discovered clients to be the transferee for a transfer of a certain amount of money. The transferor client sends this transfer request to the transferee client in step 321, leading to a sending/receiving request process state 330. When the transferee client receives such a request in step 322, the transferee client is similarly advanced to the sending/receiving request process state 330. In the sending/receiving request process state 330, either the transferor or the transferee can cancel the proposed transfer in step 331, which transitions both the transferor and the transferee clients back to the discovery process state 320. On the other hand, both clients, or at least the transferee client, can approve the transfer request in step 332, transitioning the transferor and the transferee clients to the transfer process state 340. In the transfer process state, one or both of these clients transmit the transfer request to the server for performance. In a transfer complete step 341, the clients display an indication that the transfer has been initiated, and transitioned the clients back to the discovery process state 320.

Figure 4:
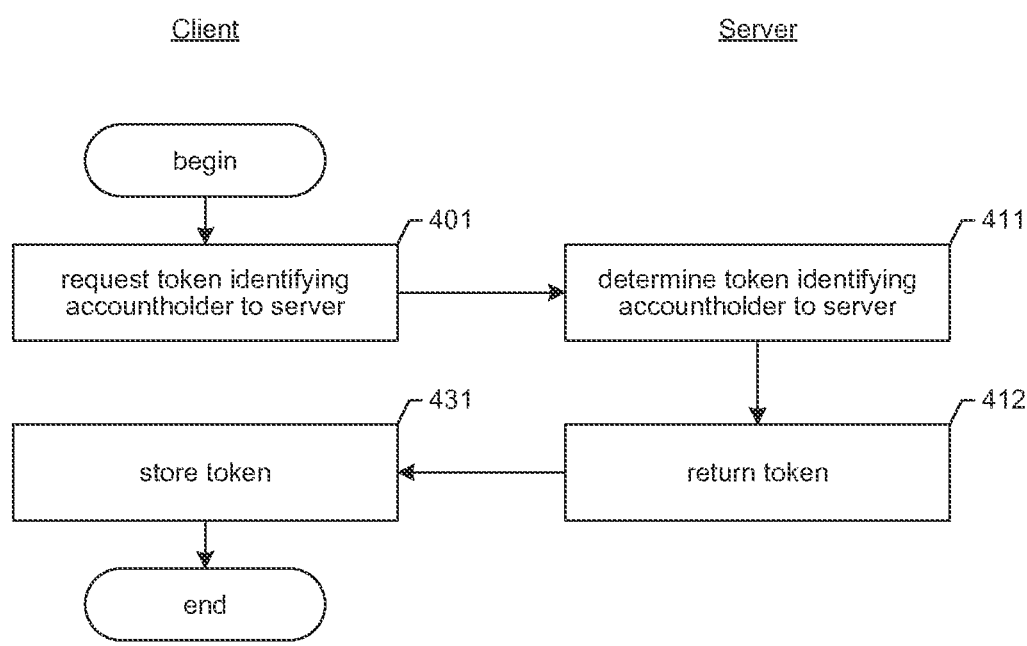
FIG. 4 is a flow diagram showing steps typically performed by the facility in order to assign a token to a client.

FIG. 4 is a flow diagram showing steps typically performed by the facility in order to assign a token to a client. In step 401, on the client, the facility requests a token that will serve to identify the accountholder using the client to the server. As part of this request, the client includes another form of data identifying the accountholder to the server, which may include such forms as an account number, a user ID, a password, or other information, either inputted contemporaneously by the user or retrieved from storage on the client for another device. In step 411, the server determines a token identifying the accountholder to the server. In some environments, this involves determining whether the server has earlier allocated a token to the accountholder, and using that token. In cases where this is not true, or to provide an extra measure of security even where it is true, on the server, the facility generates a token for the accountholder. In some embodiments, the token is large and cryptographically random, making it difficult to guess. In some embodiments, in step 411, the facility uses a random number generator implemented in accordance with Section 4.9.1 of the FIPS standard 140-2, "Security Requirements for Cryptographic Modules," hereby incorporated by reference in its entirety. In some embodiments, the facility provides the random number generator with a seed value as specified in RFC 1750, "Randomness Recommendations for Security," hereby incorporated by reference in its entirety. In some embodiments, the facility uses the Hash_DRBG random number generator, using SHA1 as the implemented hash function. In some embodiments, SHA-256 is the implemented hash function. In step 412, on the server, the facility returns the token to the client. In step 431, on the client, the facility stores the token returned by the server. After step 431, these steps conclude.

Those skilled in the art will appreciate that the steps shown in FIG. 4 and in each of the flow diagrams discussed below may be altered in a variety of ways. For example, the order of the steps may be rearranged; some steps may be performed in parallel; shown steps may be omitted, or other steps may be included; a shown step may divided into substeps, or multiple shown steps may be combined into a single step, etc.

Figure 5:
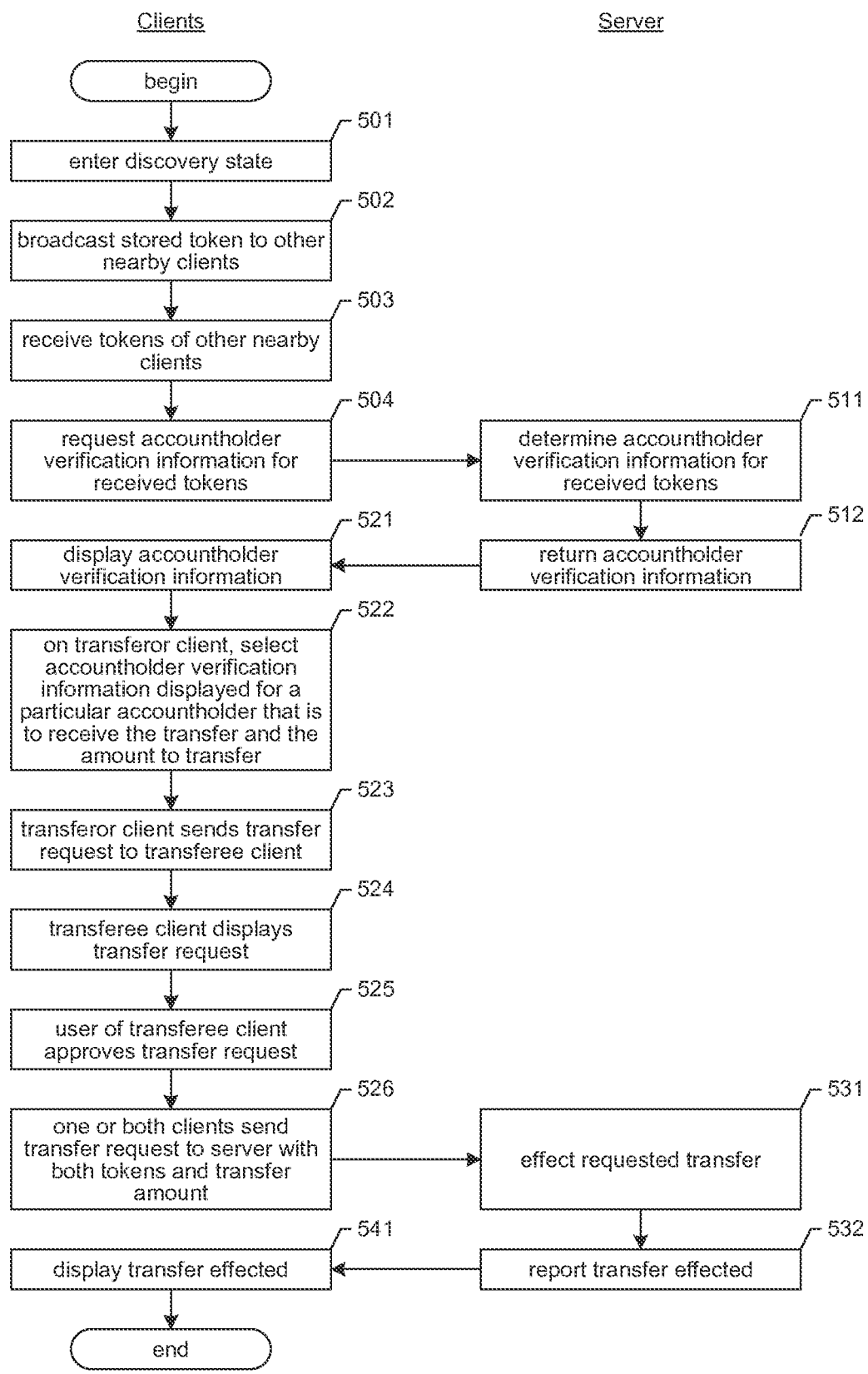
FIG. 5 is a flow diagram showing steps typically performed by the facility in order to initiate a funds transfer between accountholders.

FIG. 5 is a flow diagram showing steps typically performed by the facility in order to initiate a funds transfer between accountholders. In step 501, on each of two or more clients, the facility enters a discovery state. In some embodiments, on each client, step 501 includes an explicit action by the accountholder using the client such as launching an app on the client, performing an user interaction such as a menu selection within an app on the client, modifying a configuration setting of the client, etc. In some embodiments, at least some clients remain in a persistent discovery state. In step 502, on each of the clients, the facility, having entered the discovery state, broadcasts the token stored by the client to other nearby clients. In some embodiments, the facility ensures that only nearby clients receive the broadcasted tokens by using a broadcast mechanism having limited range, such as Bluetooth low energy, wifi direct, or near-field communication. In various other embodiments, other broadcast mechanisms whose range is similarly limited are used. In some embodiments, the facility uses another communication mechanism whose range is not necessarily as significantly limited, and further uses an explicit absolute or relative geolocation mechanism to ensure that the clients are within an acceptable range of one another, such as, for example, GPS. In various embodiments, the facility limits nearby clients to those that are, for example, within 20 feet, within 30 feet, within 50 feet, and within 100 feet.

In step 503, on each client, the facility receives the tokens of the other nearby clients broadcast in step 502. In step 504, on each client, the facility requests from the server accountholder verification information for each of the tokens received by the client in step 503. In step 511, on the server, for each request received from a client, the facility determines accountholder verification information for the tokens specified in the received request. In some embodiments, the accountholder verification information determined in step 511 includes an image associated the accountholder, such as an image of the accountholder's face. In some embodiments, the determined accountholder verification information includes part or all of the accountholder's name. In various embodiments, a variety of other types of accountholder verification information is determined by the facility. In step 512, on the server, the facility returns the accountholder verification information determined in step 511 to the requesting client. In step 521, on each of the clients, the facility displays the accountholder verification information received from the server in order to permit the accountholder using the client to select the accountholder of a nearby client as the transferee for a transfer.

Figure 6:
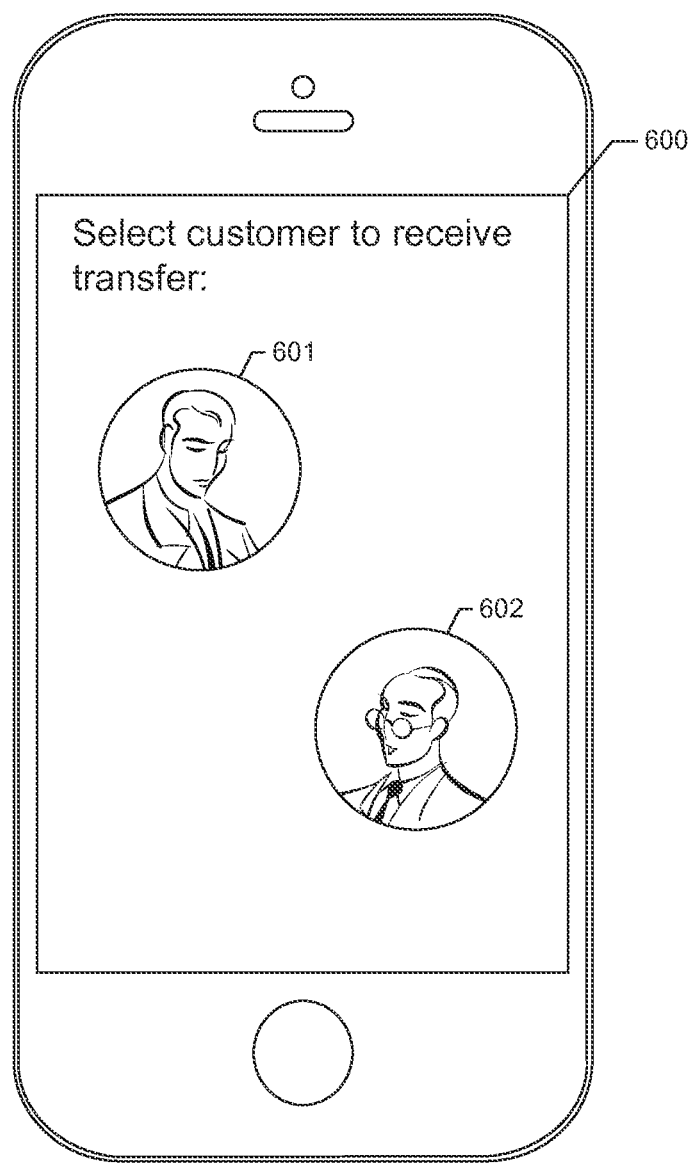
FIG. 6 is a display diagram showing a sample visual user interface presented by the facility on a client in some embodiments to enable selection of a transferee accountholder.

FIG. 6 is a display diagram showing a sample visual user interface presented by the facility on a client in some embodiments to enable selection of a transferee accountholder. The display 600 includes images 601 and 602, each showing the face of an accountholder using a client that is nearby. The accountholder using this client can select one of these images to designate the associated accountholder as transferee for a transfer.

Returning to FIG. 5, in step 522, on a transferor client, in response to user input, the facility selects the accountholder verification information displayed for a particular accountholder to receive a transfer, as well as an amount to transfer.

Figure 7:
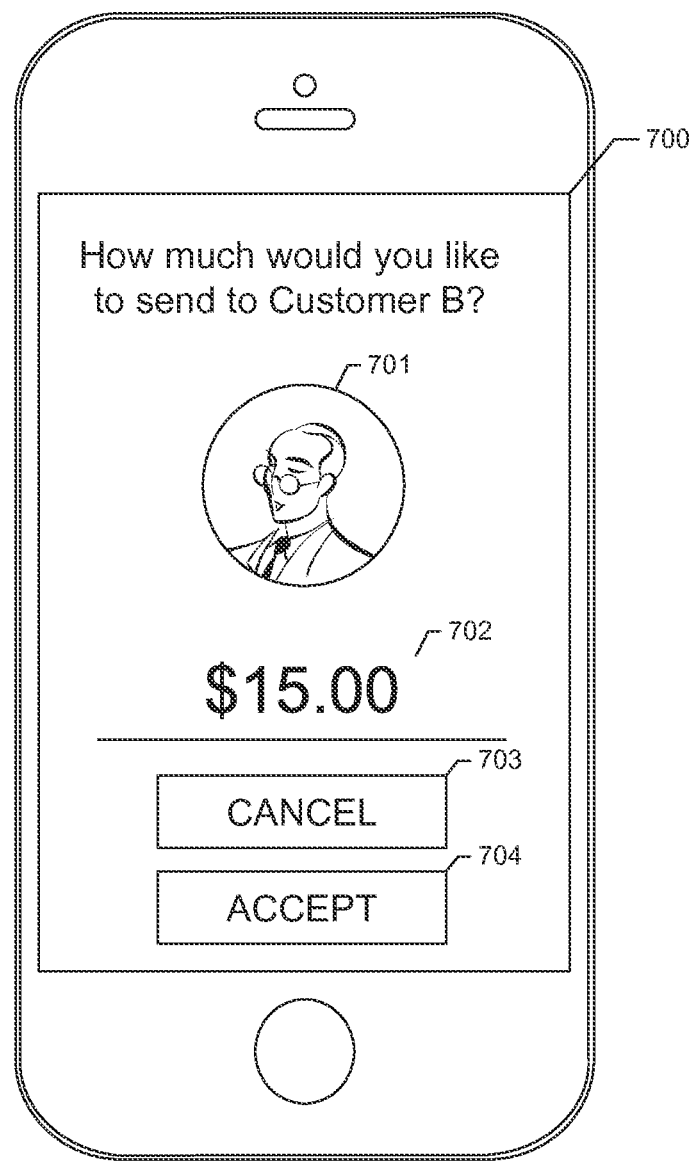
FIG. 7 is a display diagram showing a sample visual user interface presented by the facility in some embodiments to generate a transfer request for a particular transferee accountholder.

FIG. 7 is a display diagram showing a sample visual user interface presented by the facility in some embodiments to generate a transfer request for a particular transferee accountholder. The display 700 includes the transferee accountholder's name, image 701 of the transferee accountholder's face, as well as a field 702 into which the user of the client on which this display is being presented can enter the transfer amount, here $15. The display further includes a cancel control 703 that the user may activate to cancel the proposed transfer, and an accept button 704 that the user can activate in order to proceed with the proposed transfer.

Returning to FIG. 5, in step 523, on the transferor client, the facility sends a transfer request to the transferee client that contains the token stored on the transferor client as well as the amount of the proposed transfer. In step 524 on the transferee client, the facility displays information about the transfer request.

Figure 8:
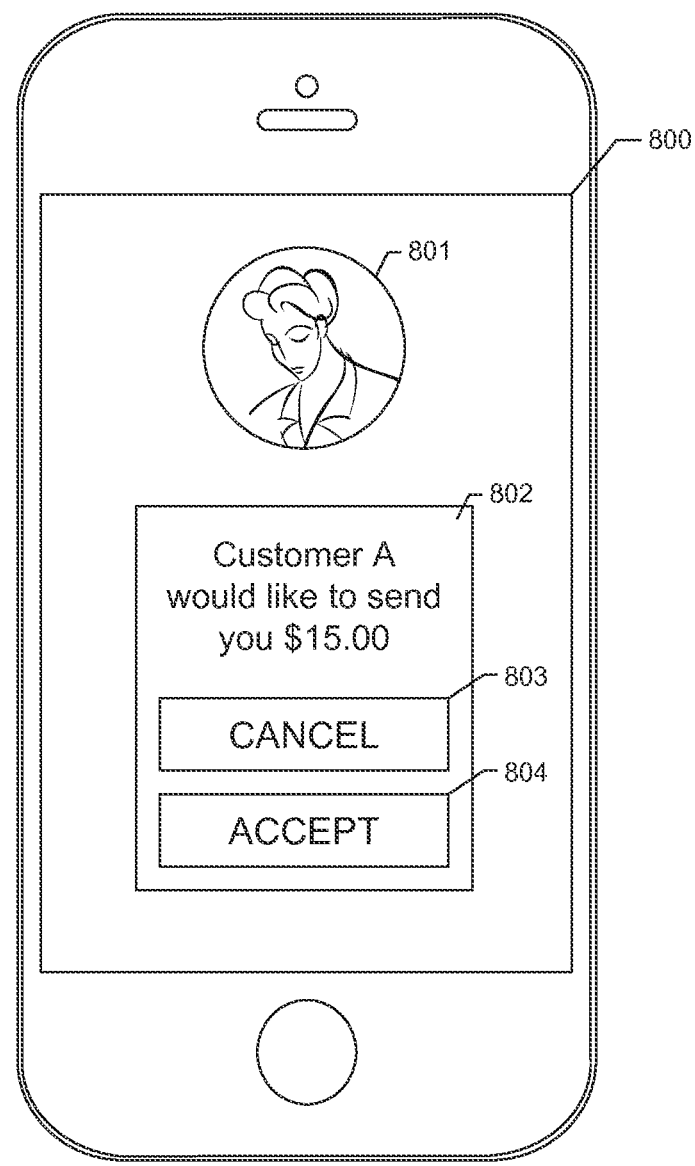
FIG. 8 is a display diagram showing a sample visual user interface presented by the facility in some embodiments in order to notify the accountholder using the client of a transfer request, and allowing this accountholder to approve the transfer request

FIG. 8 is a display diagram showing a sample visual user interface presented by the facility in some embodiments in order to notify the accountholder using the client of a transfer request, and allowing this accountholder to approve the transfer request. Display 800 includes an image 801 of the transferor accountholder's face; text 802 including the transferor accountholder's name and the amount of the proposed transfer; a cancel control 803 that the user can activate in order to decline the proposed transfer; and an accept control 804 that the user may activate in order to approve the proposed transfer.

Returning to FIG. 5, in step 525, on the transferee client, the facility determines that the user using the transferee client has approved the transfer request. In step 526, on one or both of the clients, the facility sends the transfer request or equivalent information to the server, including both tokens and the transfer amount. In step 531, on the server, the facility effects the requested transfer. In some embodiments, step 531 involves directly effecting the requested transfer, by identifying for each of the tokens an account under the direct control of the facility corresponding to the token, and, in an anatomic operation, decrementing a balance value for the transferor account by the transfer amount while simultaneously or nearly-simultaneously incrementing the balance value for the transferee account by the same amount. In various other embodiments, the facility uses a variety of other approaches to effect the requested transfer, either directly or indirectly, with respect to accounts are both under the direct control of the facility, are neither under the direct control of the facility, or include only one account under the direct control of the facility. In step 532, on the server, the facility reports to the clients the transfer effected in step 531. In step 541, on each of the clients, the facility displays information indicating that the transfer was effected. In some embodiments, this display information includes the amount of the transfer; information identifying the other party to the transfer; and/or a balance amount for the accountholder that reflects the effect of the transfer. After step 541, these steps conclude.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A computer-readable medium having contents adapted to cause a first computing device to perform a method for conducting a funds transfer operation from a funding account belonging to a funding person, the first computing device associated with an identifier identifying the funding person, the method comprising:
   selecting one or more second computing devices, each selected second computing device being physically located within a threshold distance of the first computing device;
   from each of the one or more second computing devices, receiving, via a range-limited wireless communication protocol, an identifier identifying a person associated with the second computing device;
   for each of the second computing devices:
      accessing information, from a facility server storing account information of accountholders, about the person identified by the identifier with which the second computing device is associated based on the identifier received from the second computing device, the accessed information comprising an image of the person identified by the identifier with which the second computing device is associated;
      displaying at least a portion of the accessed information about the person identified by the identifier with which the second computing device is associated that includes the image of the person identified by the identifier with which the second computing device is associated;
   receiving user input selecting information displayed about one of the people; and
   receiving user input specifying an amount of money,
   wherein the specified amount of money is transferred from the funding account to an account belonging to the person whose displayed information was selected.

2. The computer-readable medium of claim 1, further comprising, before the specified amount of money is transferred, sending a communication to the second computing device associated with the person whose displayed information was selected seeking confirmation of the transfer.

3. A method for conducting a funds transfer operation from a funding account belonging to a funding person, the method performed in a first computing device associated with an identifier identifying the funding person, the method comprising:
   broadcasting an identifier identifying the funding person from the first computing device to one or more third devices,
   selecting one or more second computing devices among the one or more third devices, each selected second computing device (1) being physically located within a threshold distance of the first computing device, and (2) being associated with an identifier identifying a person;
   for each of the identified second computing devices:
      accessing information, from a facility server storing account information of accountholders, about the person identified by the identifier with which the second computing device is associated; and
      displaying at least a portion of the accessed information about the person;
   receiving user input selecting information displayed about one of the people; and
   receiving user input specifying an amount of money, wherein the specified amount of money is transferred from the funding account to an account belonging to the person whose displayed information was selected.

4. The method of claim 3 wherein the selected displayed information includes an image of the person whose displayed information was selected.

5. The method of claim 3 wherein the selected displayed information includes at least a portion of the name of the person whose displayed information was selected.

6. The method of claim 3 wherein transferring the specified amount of money further comprises sending to a separate computing device the identifier identifying the person whose displayed information was selected.

7. The method of claim 6 wherein transferring the specified amount of money further comprises sending to a separate computing device the identifier identifying the funding person.

8. The method of claim 6 wherein transferring the specified amount of money further comprises sending to a separate computing device an indication of the specified amount of money.

9. The method of claim 3, further comprising, before the specified amount of money is transferred, receiving an indication that the second computing device has received user input confirming transfer.

10. The method of claim 3 wherein the threshold distance is 50 feet or less.

11. The method of claim 3 wherein the threshold distance is dictated by a short-range data exchange mechanism.

12. The method of claim 3 wherein the accessing and transferring are both performed via a secure connection to a distinct computing device.

13. A method in a computing system for conducting a funds transfer operation from a funding account belonging to a funding person, the first computing device associated with an identifier identifying the funding person, the method comprising:
   selecting one or more second computing devices, each selected second computing device being physically located within a threshold distance of the first computing device;
   from each of the one or more second computing devices, receiving, via a range-limited wireless communication protocol, an identifier identifying a person associated with the second computing device;
   for each of the second computing devices:
      accessing information, from a facility server storing account information of accountholders, about the person identified by the identifier with which the second computing device is associated based on the identifier received from the second computing device, the accessed information comprising an image of the person identified by the identifier with which the second computing device is associated;
      displaying at least a portion of the accessed information about the person identified by the identifier with which the second computing device is associated that includes the image of the person identified by the identifier with which the second computing device is associated;
   receiving user input selecting information displayed about one of the people; and
   receiving user input specifying an amount of money,
   wherein the specified amount of money is transferred from the funding account to an account belonging to the person whose displayed information was selected.

14. The method of claim 13, further comprising, before the specified amount of money is transferred, sending a communication to the second computing device associated with the person whose displayed information was selected seeking confirmation of the transfer.

15. A computer-readable medium having contents adapted to cause a first computing device to perform a method for conducting a funds transfer operation from a funding account belonging to a funding person, the first computing device associated with an identifier identifying the funding person, the method comprising:
   broadcasting an identifier identifying the funding person from the first computing device to one or more third devices,
   selecting one or more second computing devices among the one or more third devices, each selected second computing device (1) being physically located within a threshold distance of the first computing device, and (2) being associated with an identifier identifying a person;
   for each of the identified second computing devices:
      accessing information, from a facility server storing account information of accountholders, about the person identified by the identifier with which the second computing device is associated;
      displaying at least a portion of the accessed information about the person;
   receiving user input selecting information displayed about one of the people; and
   receiving user input specifying an amount of money,
   wherein the specified amount of money is transferred from the funding account to an account belonging to the person whose displayed information was selected.

16. The computer-readable medium of claim 15 wherein the selected displayed information includes an image of the person whose displayed information was selected.

17. The computer-readable medium of claim 15 wherein the selected displayed information includes at least a portion of the name of the person whose displayed information was selected.

18. The computer-readable medium of claim 15 wherein transferring the specified amount of money further comprises sending to a separate computing device the identifier identifying the person whose displayed information was selected.

19. The computer-readable medium of claim 18 wherein transferring the specified amount of money further comprises sending to a separate computing device the identifier identifying the funding person.

20. The computer-readable medium of claim 18 wherein transferring the specified amount of money further comprises sending to a separate computing device an indication of the specified amount of money.

21. The computer-readable medium of claim 15, the method further comprising, before the specified amount of money is transferred, receiving an indication that the second computing device has received user input confirming transfer.

22. The computer-readable medium of claim 15 wherein the threshold distance is 50 feet or less.

23. The computer-readable medium of claim 15 wherein the threshold distance is dictated by a short-range data exchange mechanism.

24. The computer-readable medium of claim 15 wherein the accessing and transferring are both performed via a secure connection to a distinct computing device.

25. A first computing device adapted to conduct a funds transfer operation from a funding account belonging to a funding person, the first computing device associated with an identifier identifying the funding person, the first computing device comprising:
- a processor; and
- a memory having contents configured to, when executed by a processor, perform a method comprising:
  - selecting one or more second computing devices, each selected second computing device being physically located within a threshold distance of the first computing device;
  - from each of the one or more second computing devices, receiving, via a range-limited wireless communication protocol, an identifier identifying a person associated with the second computing device;
  - for each of the second computing devices:
    - accessing information, from a facility server storing account information of accountholders, about the person identified by the identifier with which the second computing device is associated based on the identifier received from the second computing device, the accessed information comprising an image of the person identified by the identifier with which the second computing device is associated;
    - displaying at least a portion of the accessed information about the person identified by the identifier with which the second computing device is associated that includes the image of the person identified by the identifier with which the second computing device is associated;
  - receiving user input selecting information displayed about one of the people; and
  - receiving user input specifying an amount of money, wherein the specified amount of money is transferred from the funding account to an account belonging to the person whose displayed information was selected.

26. The first computing device of claim 25, the method further comprising, before the specified amount of money is transferred, sending a communication to the second computing device associated with the person whose displayed information was selected seeking confirmation of the transfer.

27. A first computing device adapted to conduct a funds transfer operation from a funding account belonging to a funding person, the first computing device associated with an identifier identifying the funding person, the first computing device comprising:
- a processor; and
- a memory having contents configured to, when executed by a processor, perform a method comprising:
  - broadcasting an identifier identifying the funding person from the first computing device to one or more third devices,
  - selecting one or more second computing devices among the one or more third devices, each selected second computing device (1) being physically located within a threshold distance of the first computing device, and (2) being associated with an identifier identifying a person;
  - for each of the identified second computing devices:
    - accessing information, from a facility server storing account information of accountholders, about the person identified by the identifier with which the second computing device is associated;
    - displaying at least a portion of the accessed information about the person;
  - receiving user input selecting information displayed about one of the people;
  - receiving user input specifying an amount of money; and
  - causing the specified amount of money to be transferred from the funding account to an account belonging to the person whose displayed information was selected.

28. The first computing device of claim 27 wherein the selected displayed information includes an image of the person whose displayed information was selected.

29. The first computing device of claim 27 wherein the selected displayed information includes at least a portion of the name of the person whose displayed information was selected.

30. The first computing device of claim 27 wherein transferring the specified amount of money further comprises sending to a separate computing device the identifier identifying the person whose displayed information was selected.

31. The first computing device of claim 30 wherein transferring the specified amount of money further comprises sending to a separate computing device the identifier identifying the funding person.

32. The first computing device of claim 30 wherein transferring the specified amount of money further comprises sending to a separate computing device an indication of the specified amount of money.

33. The first computing device of claim 27, the method further comprising, before the specified amount of money is transferred, receiving an indication that the second computing device has received user input confirming transfer.

34. The first computing device of claim 27 wherein the threshold distance is 50 feet or less.

35. The first computing device of claim 27 wherein the threshold distance is dictated by a short-range data exchange mechanism.

36. The first computing device of claim 27 wherein the accessing and transferring are both performed via a secure connection to a distinct computing device.

* * * * *